United States Patent [19]

Loke

[11] 4,374,025
[45] Feb. 15, 1983

[54] WATER CONDITIONING REGENERATION CONTROL

[76] Inventor: Harvey L. Loke, 350 9th St. SW., Wells, Minn. 56097

[21] Appl. No.: 334,131

[22] Filed: Dec. 24, 1981

[51] Int. Cl.³ .............................................. C02B 1/22
[52] U.S. Cl. .................................... 210/140; 210/191
[58] Field of Search ....................... 210/140, 191, 139

[56] References Cited

U.S. PATENT DOCUMENTS

| | | | |
|---|---|---|---|
| 3,349,915 | 10/1967 | Fleckenstein et al. | 210/140 X |
| 3,380,590 | 4/1968 | Grayson | 210/191 X |
| 3,591,005 | 7/1971 | Traveas | 210/140 |
| 3,872,004 | 3/1975 | Grout et al. | 210/140 X |
| 4,181,605 | 1/1980 | Braswell | 210/140 X |

Primary Examiner—John Adee

Attorney, Agent, or Firm—McWilliams, Mann & Zummer

[57] ABSTRACT

A water conditioning system is provided with an improved resin regeneration arrangement. Included in this system is a flow control valve associated with a brine injector mechanism which provides for a very slow rinse of the treatment resin at the end of the brine draw cycle. This provides for greater interaction between brine and resin and, therefore, more efficient and economical use of salt. The flow control valve utilizes a floating ball and a notched seat to permit substantially unrestricted flow when the ball is floating and brine is being supplied to treatment tank and greatly restricted flow when the ball is seated and untreated water is being used to rinse the brine from the treatment tank.

9 Claims, 6 Drawing Figures

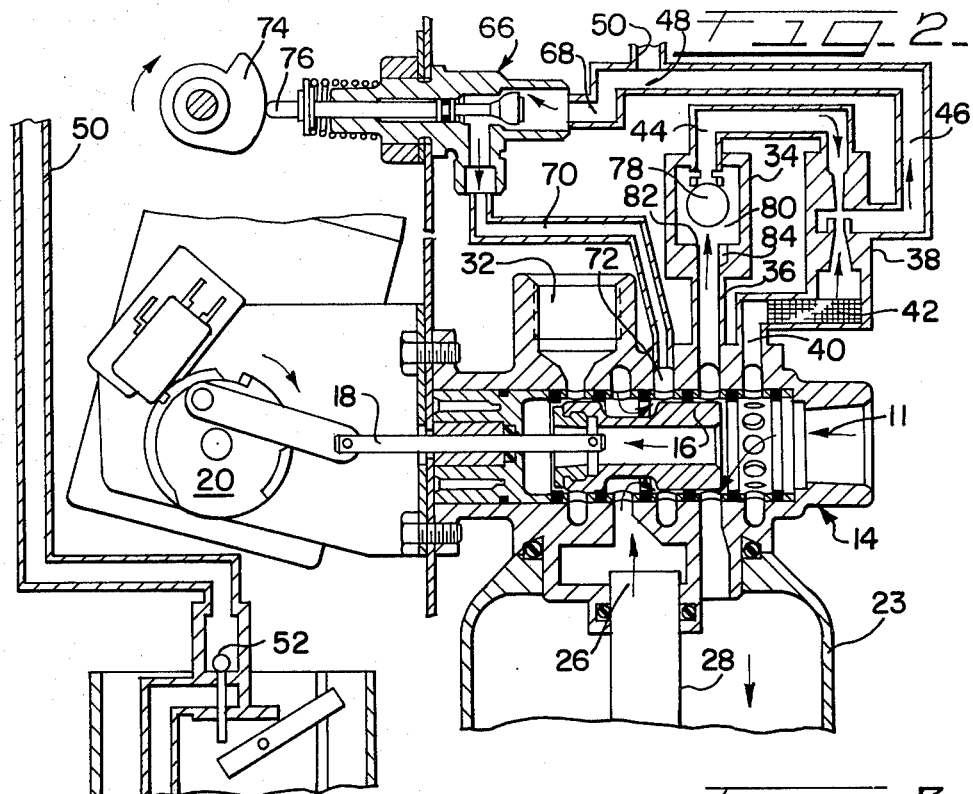
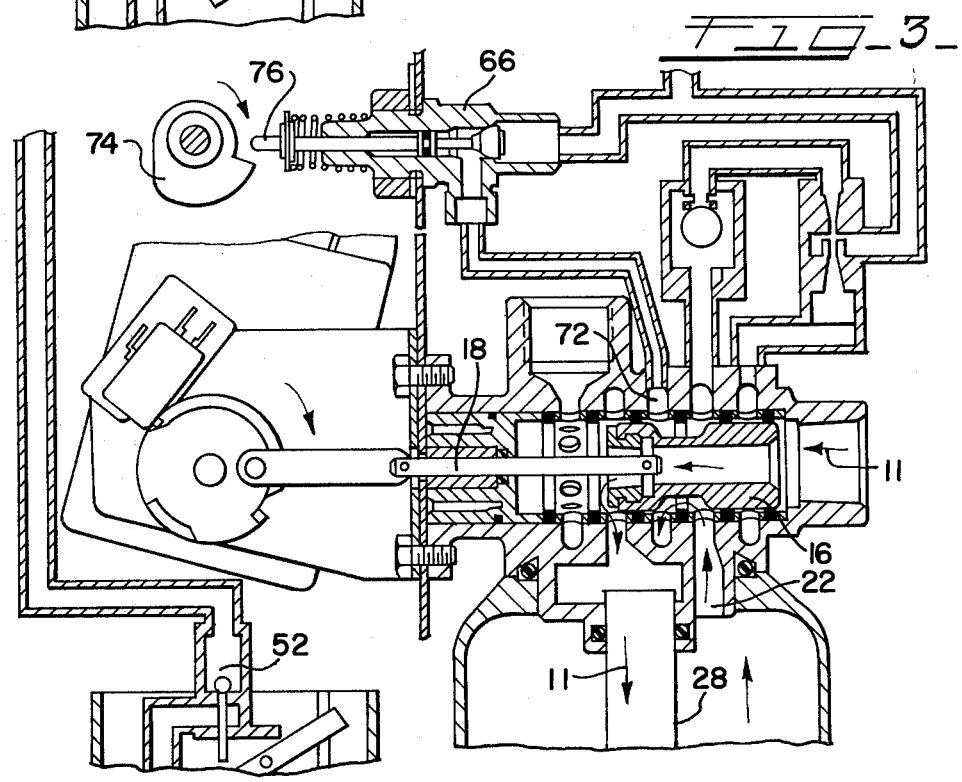

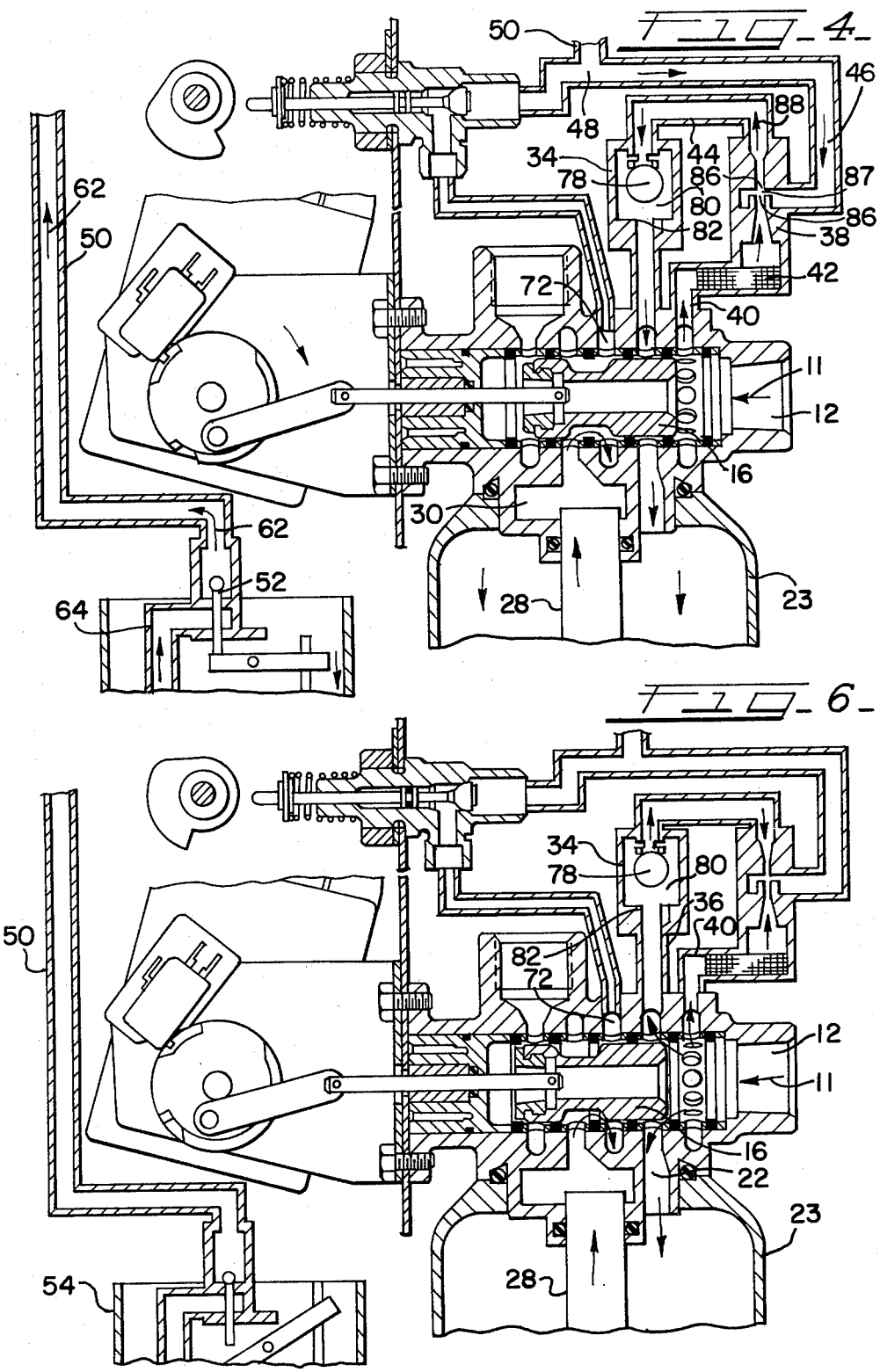

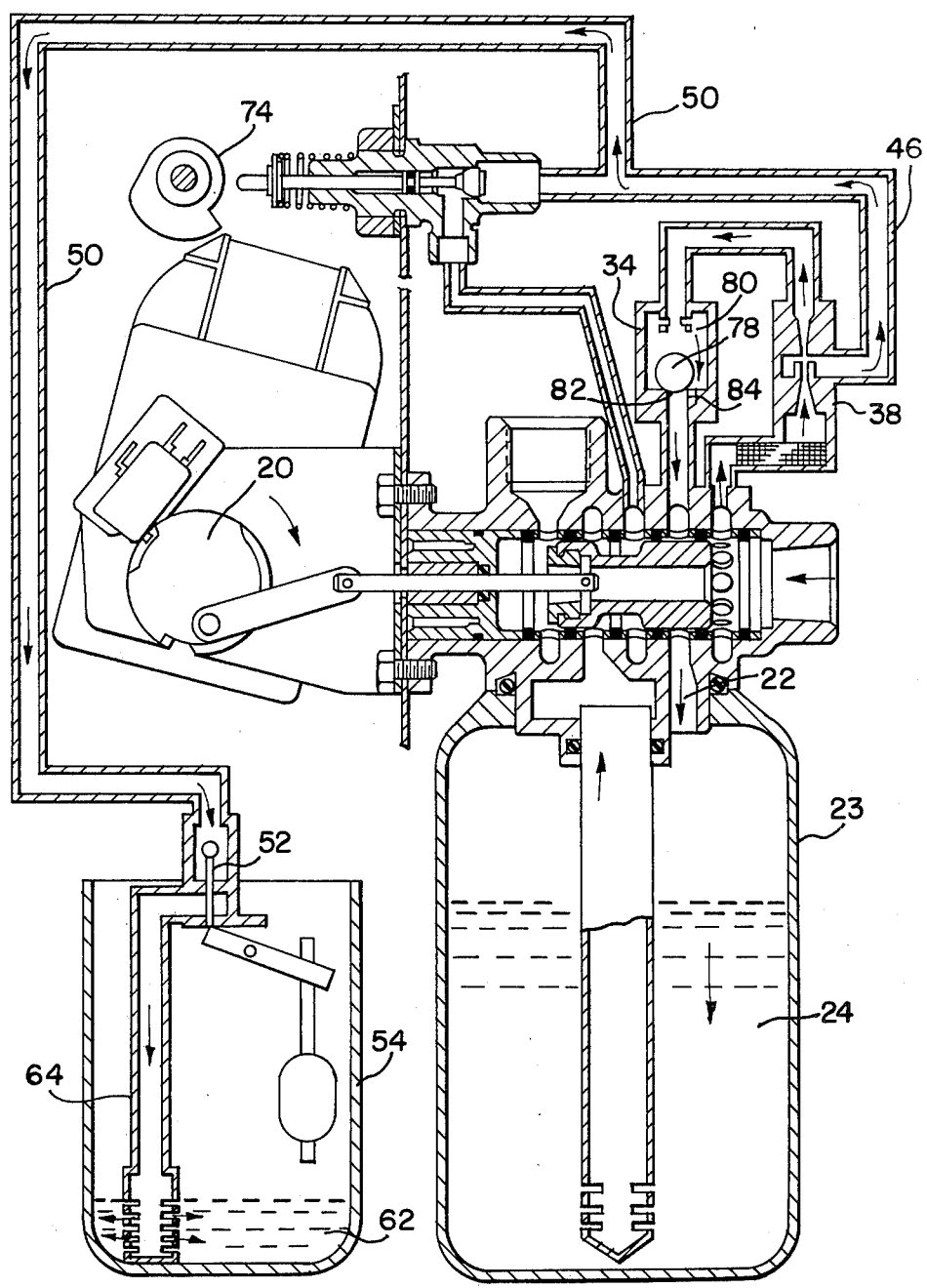

WATER CONDITIONING REGENERATION CONTROL

SUMMARY OF THE INVENTION

The present invention is directed to new and useful improvements in regeneration systems for water softeners, and is particularly concerned with improvements in a flow control valve used to pass brine through the water softener's control valve to the treatment tank's resinous material.

In the prior art, a slow rinse of the resinous material in the treatment tank with brine was provided during regeneration by means of a restricted flow of hard water through narrow openings in the system's brine injectors. This slow rinse lasted from the end of the flow from the brine tank to the beginning of the rapid rinse and brine tank fill as dictated by the timer actuated control valve.

Among the devices in the pertinent prior art are those described in U.S. Pat. Nos. 3,591,005 to Travers issued July 6, 1971; 3,872,004 to Grout et al. issued Mar. 18, 1975; 4,104,165 issued Aug. 1, 1978, to Braswell, and 4,181,605 issued to Braswell on Jan. 1, 1980. These devices illustrate flow restricting and diverting devices, but none do so in the same manner nor do they accomplish the same result as the present invention.

The Travers patent discloses a flow check valve used to divert hard water through a brine injector and, thus, to draw brine into the injector. The Grout device utilizes a ball valve, but it is not used as in the present invention to provide a slow rinse.

The first Braswell device is shown using a check valve, but this does not cause a diminished flow as the new valve in the present invention does. The later Braswell device utilizes a control means which opens and closes the wash valve intermittently during the brining and rinse cycle to provide a pulsating liquid flow through the resinous material in the tank.

A slow rinse of the resinous material in the treatment tank with brine is advantageous to the regeneration process since the longer the brine solution is in contact with the resinous material, the more complete is the exchange of the hard water deposited calcium ions being replaced by sodium ions from the brine. In this way, less brine and hence less salt is needed to effectuate the regeneration process.

A very slow rinse at the end of the brine draw has been accomplished in prior art devices by using extremely restrictive injectors. Unfortunately, such a device is impractical owing to the fact that such restrictive injectors are easily clogged by particles in the water. Once clogged, the injectors become unusable and regeneration is impossible. Such clogging necessitates the dismantling of the injectors and the removal of the debris before the system can be effective again.

The present invention solves the aforementioned problem by means of an orifice between the injector and the resin tank which is self-cleaning. A floating ball and seat valve arrangement is utilized with a small notch defined in the periphery of the valve seat. When the valve's fluid chamber is flooded with water or brine solution, the ball floats and the flow is substantially unrestricted. When the flow of brine solution from the brine tank is exhausted, the ball drops into the seat so that the flow of hard water through the injectors to rinse the brine from the resin is restricted by the notch in the seat's periphery in one embodiment and in another embodiment, without a notch in the valve seat, seals against any flow of hard water to the treatment tank. This occurs because when the brine is exhausted from the tank, instead of brine, air is drawn by means of the brine intake into the chamber containing the ball. The air cannot support the ball so it drops to the seat.

DESCRIPTION OF THE DRAWINGS

FIG. 2 illustrates the major operative components of the system shown in FIG. 1 during the venting transient phase.

FIG. 3 illustrates the major operative components of the system shown in FIG. 1 during the backwash cycle.

FIG. 4 illustrates the major operative components of the system shown in FIG. 1 during the brine draw cycle.

FIG. 5 illustrates the system shown in FIG. 1 during the slow rinse and brine fill cycle.

FIG. 6 illustrates the major operative components of the system shown in FIG. 1 during the rapid rinse cycle.

DETAILED DESCRIPTION OF THE PREFERRED EMBODIMENT

Figure 1:
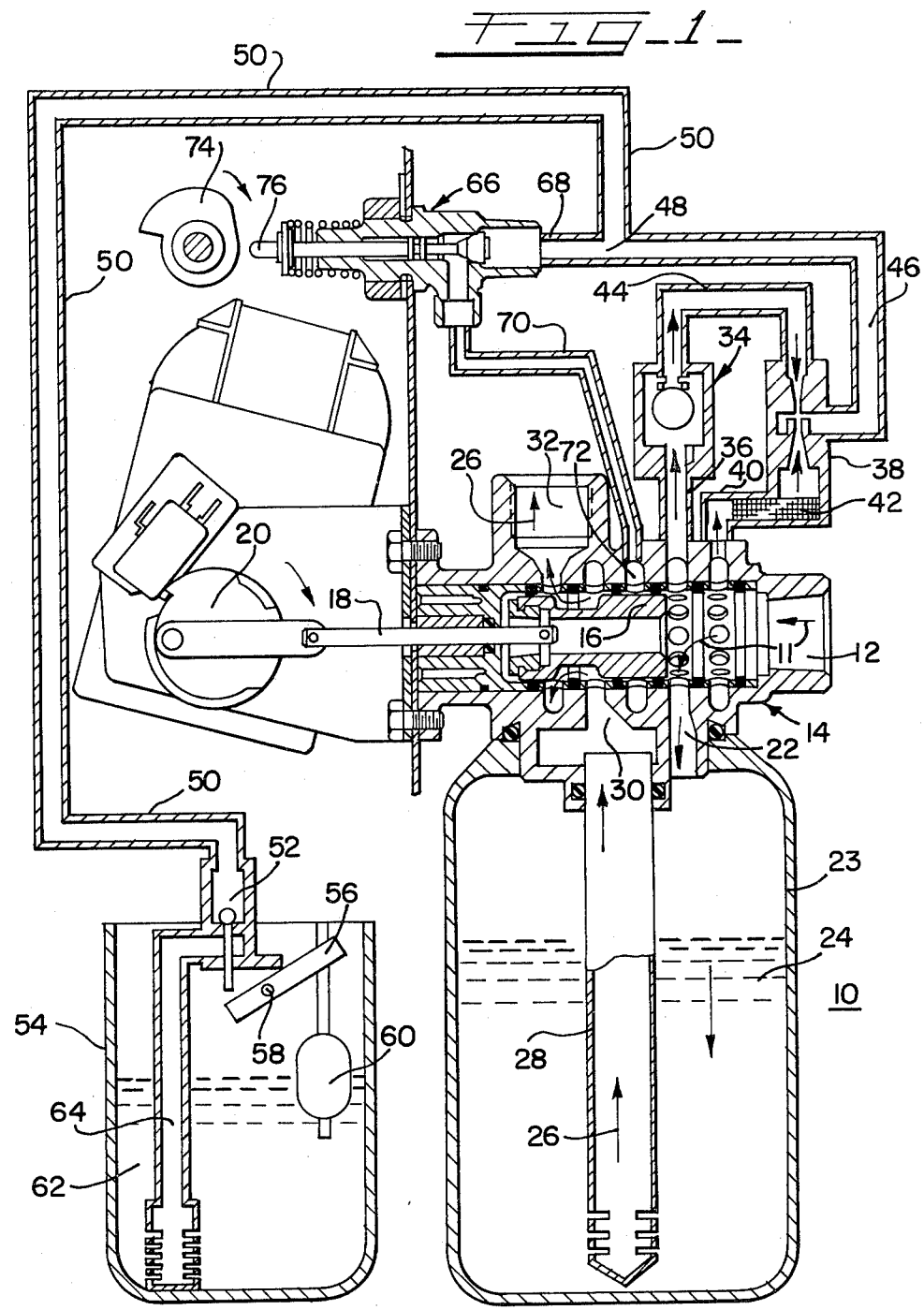
FIG. 1 illustrates a schematic view of a water conditioning system embodying the present invention during the service cycle.

Now turning to the drawings, in FIG. 1 is shown a water conditioning system 10 embodying the present invention. The water conditioning system in this view is shown in the normal or service cycle. Untreated water 11 enters inlet 12 of control valve 14. In this cycle, piston 16 of the control valve 14 is shown drawn back to its extreme rearward position by arm 18 of timer 20. Untreated water 11 passes through treatment tank inlet 22 into treatment tank 23 and passes downwardly through mineral bed 24. Resinous bed 24 is composed of a resinous material charged with sodium ions. In this cycle, calcium and other "hard water" ions are exchanged for sodium ions. After passing through the resinous bed, treated water 26 flows upwardly through center tube 28. The flow of treated water then passes through treatment tank outlet 30 to treated water outlet 32.

Also shown in FIG. 1 is flow control valve 34 disposed above and in communication with control valve 14 by line 36. Injector 38 is shown disposed above control valve 14 and in communication therewith by line 40. Disposed between line 40 and injector 38 is filter screen 42. Line 44 connects flow control valve 34 with injector 38. Line 46 runs from injector 38 to line junction 48. Line 50 runs from line junction 48 down to brine valve 52 disposed at the top of brine tank 54. Brine valve 52 is shown in the closed position as operated by float arm 56 mounted on pivot 58 and positioned by the buoyancy of float 60 in brine 62. Brine intake 64 is shown disposed below brine valve 52 within brine tank 54.

Auxiliary valve 66 is shown disposed between line 68 (leading from line junction 48) and drain line 70 leading to drain 72. Auxiliary valve 66 is operated by cam 74 whose rotary operation is synchronized with that of timer 20. In this cycle, auxiliary valve 66 is shown in the closed position since it is naturally biased toward a closed position and in this cycle, valve stem 76 is not in contact with cam 74.

When the resinous bed 24 is in need of regeneration by means of a flow of brine from the brine tank as determined by the timer mechanism, the service cycle ends and the regeneration process commences with the succeeding cycles.

In FIG. 2 is shown the next phase of operation of the water conditioning system illustrated in FIG. 1, the venting transient phase. In this cycle, timer 20 and cam 74 are rotating clockwise so that piston 16 goes from the rearward position to the extreme forward position. Arm 18 moves piston 16 forward. Cam 74 urges valve stem 76 forward opening auxiliary valve 66. In this cycle, untreated water passes through the treatment tank briefly without any effect on the cycle. Untreated water flows upwardly through line 36 to flow control valve 34, flooding the flow control valve with water thereby purging air that may have been left from the last regeneration cycle therefrom and allowing ball 78 to rise in chamber 80 of flow control valve 34, unseating the ball from valve seat 82 shown partly in phantom, and valve seat notch 84. This flow continues through tube 44 to injector 38 which also received untreated water through line 40 and filter 42. These combined flows continue through line 46, past line junction 48, through line 68, through auxiliary valve 66, to drain 72 by way of drain line 70. As in FIG. 1, brine valve 52 is shown closed so that flow through line 50 is blocked.

FIG. 3 illustrates the next step in the regeneration process, the backwash cycle, in which impurities are flushed from the treatment tank resinous bed by a reverse flow of untreated water. In this cycle, the piston 16 is pushed by arm 18 to its extreme forward position. Untreated water 11 flows through piston 16 and down through center tube 28. As this water is flushed upwardly through resinous bed 24, its flow continues upwardly through treatment tank inlet 22 to drain 72. Since brine valve 52 and auxiliary valve 66 are both closed, all other flow through the system is blocked.

FIG. 4 illustrates the next step in the regeneration process in which brine from the brine tank is drawn through the mineral bed in the treatment tank depositing sodium ions on the resinous material therein and removing calcium and other "hard water" ions therefrom. In this cycle, (and all other cycles except the vent cycle shown in FIG. 2) the auxiliary valve is closed. The piston 16 is drawn back to permit direct access of flow from inlet 12 to line 40 and to permit flow from treatment tank outlet 30 to drain 72.

Untreated water 11 enters inlet 12 and flows through line 40, passing through filter screen 42 into injector 38. The venturi effect at the constricted throat of injector 38, consisting of first orifice 85, second orifice 86, and intermediate area 87, creates suction in line 46 which draws brine 62 through brine intake 64 past brine valve 52, which opens due to the suction on it, and upwardly through line 50 and past line junction 48. A brine mixture 88 then flows through line 44 to flow control valve 34. This full flow through flow control valve 34 keeps ball 78 afloat in chamber 80 and permits substantially unrestricted flow through valve seat 82 around piston 16 and into treatment tank 23. All flow is expelled through center tube 28 to drain 72.

FIG. 5 illustrates the slow rinse and brine fill cycle which is a unique characteristic of the present invention. As seen in this illustration, the cam and timer are in the same positions as shown in FIG. 4. In this step, however, the level of brine 62 in brine tank 54 has fallen below the uppermost opening in brine intake 64. The flow of fluid from brine tank 54 ceases at this point and air is sucked into line 50. The air travels upward into chamber 80 and displaces the water supporting the ball so that ball 78 falls as the fluid level in chamber 80 falls. Ball 78 comes to rest on valve seat 82, substantially restricting fluid flow therethrough excepting extremely limited untreated water flow through notch 84 in seat 82. Chamber 80 has become mostly full of air with a water stream trickling down the sides. This restricted flow passes through treatment tank inlet 22 into treatment tank 23 and begins the slow rinsing process of resin bed 24. Slow rinsing continues until all brine is purged through the tank and the water at the drain is free of brine. After the ball falls, untreated water flowing through injector 38 is diverted through lines 46 and 50, through open brine valve 52 to brine tank 54 to fill this tank which was depleted by the brine draw. Thus, refill of the brine tank begins immediately, which means that the brine solution is made quickly for possible use by a second treatment tank.

In FIG. 6 is shown the final cycle in the system's regeneration process. Piston 16 is shown drawn back so that flow of untreated water is unrestricted from inlet 12 to treatment tank inlet 22. This rapid flow continues through resin bed 24 in treatment tank 23 completely rinsing the resinous material in the resin bed of any brine that may remain and continuing the flow upwardly through center tube 28, then passing out to drain 72. Concurrently, untreated water flow passes from inlet 12 through lines 36 and 40 into chamber 80 of flow control valve 34, thus allowing ball 78 to float, leaving valve seat 82 substantially unrestricted. At this point, the regeneration process of resin bed 24 in treatment tank 23 has been completed and brine tank 54 has been refilled and the service cycle is ready to begin again.

As shown in the drawings, chamber 80 contains a single floating ball 78. An alternative embodiment of the invention, not shown, includes a chamber 80 containing more than one floating ball. In this manner, the bottom ball may be more firmly seated in the valve seat by the weight of the balls lined above it.

Another embodiment of the present invention, not shown, includes a valve seat 82 which is circular but does not include a notch 84. In this manner, when the floating ball drops onto the valve seat, the flow of brine may be completely stopped by the valve so that resinous bed 24 is subjected to a period of brine soaking rather than a slow rinse. This alternative embodiment may be of particular usefulness in applications where a chemical supply rather than a brine supply is used to regenerate the resinous bed or other types of beds for purposes other than water softening, for example, iron filtering. A soak cycle can be used as a means of killing bacteria in localities where this is a problem.

In a still further embodiment of the present invention, the water purification system may include more than one treatment tank. In a system with more than one tank, the slow rinse (or soak) and simultaneous brine fill gives the added benefit of rapid replenishment of brine or chemical supply so that each of the treatment tanks may be efficiently regenerated in turn.

Alternative embodiments of flow control valve 34 may be used. Flow control valve 34 and injector 38 may be combined in one housing. Additionally, a flow control valve may be used having separate ports for venting and brine intake, respectively. Alternatively, to aid the venting phase, the injector and its associated fluid port may be located at a substantially higher level than the flow control valve.

Also, an additional embodiment (not shown) could be used in which the fluid connection from the injector could be made into the side of the fluid chamber containing the flow control valve at a point below any of the balls so that the fluid stream in the chamber is entirely below the balls to prevent balls from dropping prematurely.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A water conditioning system including a water inlet for receiving water to be treated; a water outlet for emitting treated water; a treatment tank containing a supply of resinous material for conditioning of the water; a brine tank; a regeneration control mechanism in communication with said inlet, outlet, treatment tank and brine tank comprising control valve means which performs the steps of a regeneration cycle at selected time intervals; a brine valve disposed between said brine tank and said regeneration control mechanism; and an injector system associated with said regeneration control and disposed between said brine valve and said treatment tank including a fluid port in communication with said brine tank through said brine valve and in communication with said water inlet through said control valve, an injector having a first orifice in communication with said water inlet, a second orifice in communication with said treatment tank through said control valve, and an area between said orifices in communication with said fluid port, and a flow control valve disposed between said injector and said treatment tank operative such that when brine fluid is flowing from said brine tank to said treatment tank, the flow is substantially unrestricted, but when said flow from said brine tank ceases, the flow of water to said treatment tank is substantially restricted so as to prolong the interaction between said resin and said brine.

2. A water conditioning system as in claim 1 wherein said flow control valve means includes a fluid chamber, and disposed within said fluid chamber a ball, a substantially circular valve seat adapted to receive said ball, and a notch defined in the periphery of said valve seat permitting substantially restricted flow of fluid past said ball when said ball is seated in said valve seat.

3. A water conditioning system as in claim 1 wherein said flow control valve means includes a fluid chamber, and disposed within said fluid chamber a ball and a substantially circular valve seat so that when said ball is seated in said valve seat, the water flow is stopped.

4. A water conditioning system as in claim 1 including an auxiliary valve having an inlet in communication with said fluid chamber and an outlet in communication with a drain such that when said auxiliary valve is placed in an open position, air is vented from said fluid chamber to said drain and allows water to flow into said fluid chamber thereby floating the ball before the next brine draw begins.

5. A water conditioning system as in claim 1 in which a single housing includes said injector and said fluid chamber.

6. A water conditioning system as in claim 1 in which said fluid port is substantially higher than said fluid chamber to aid venting of air from said fluid chamber.

7. A water conditioning system as in claim 1 further comprising one or more additional treatment tanks.

8. A water conditioning system as in claim 2 or claim 3 further including additional balls disposed in said fluid chamber adapted to provide additional weight to more firmly seat said ball in said valve seat.

9. A water conditioning system as in claim 2 or claim 3 in which brine or other regeneration fluid enters said fluid chamber at a point below a level at which said ball would float when said chamber is substantially full of fluid, thereby preventing said ball from prematurely seating in said valve seat.

* * * * *